US007130408B2

(12) United States Patent
Creamer et al.

(10) Patent No.: US 7,130,408 B2
(45) Date of Patent: Oct. 31, 2006

(54) SERVICE LOGIC CONTEXT CACHE FOR SIGNALING EVENTS

(75) Inventors: Thomas E. Creamer, Boca Raton, FL (US); Victor S. Moore, Boynton Beach, FL (US); Glen R. Walters, Hollywood, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/172,410

(22) Filed: Jun. 14, 2002

(65) Prior Publication Data

US 2003/0231756 A1 Dec. 18, 2003

(51) Int. Cl.
*H04M 7/00* (2006.01)
(52) U.S. Cl. ............... 379/221.08; 379/221.09; 379/221.12; 370/252; 370/415; 370/496; 370/522; 370/524
(58) Field of Classification Search ........... 379/221.08, 379/221.09, 221.12; 370/252, 415, 496, 370/522, 524
See application file for complete search history.

(56) References Cited

U.S. PATENT DOCUMENTS 5,572,583 A * 11/1996 Wheeler et al. ....... 379/221.09

| 5,600,640 | A | 2/1997 | Blair et al. ................. 370/360 |
| 5,721,729 | A | 2/1998 | Klingman ................... 370/251 |
| 6,047,308 | A | 4/2000 | Grummer et al. ........... 709/200 |
| 6,101,242 | A * | 8/2000 | McAllister et al. ....... 379/88.02 |
| 6,263,372 | B1 | 7/2001 | Hogan et al. ............... 709/237 |
| 6,272,217 | B1 | 8/2001 | Cornes et al. .............. 379/333 |
| 6,785,378 | B1 * | 8/2004 | Mar .......................... 379/229 |
| 2002/0064267 | A1 | 5/2002 | Martin et al. .......... 379/201.01 |

OTHER PUBLICATIONS

Verma, M.K., et al., "Evolving Network Services Appliations of SS7 Signaling", AT&T Bell Laboratories, pp. 15-20, Nov. 22, 1989.
Funke, G., "SS7—A Universal Signalling System for Today, Tomorrow, . . . the Day After Tomorrow?", Philips Telecommunication Review, vol. 48, No. 3, pp. 11-22, Sep. 1, 1990.
PCT/GB03/02518 International Search Report dated Dec. 3, 2003.

* cited by examiner

*Primary Examiner*—Quynh H. Nguyen
(74) *Attorney, Agent, or Firm*—Akerman-Senterfitt (57) ABSTRACT

A method for sharing signaling event data in a telephony system can include receiving within a first service logic component an event from a telephony signaling network. An event context can be determined for the event and asynchronously stored within an event context cache communicatively linked with at least said first service logic component and a second service logic component.

14 Claims, 4 Drawing Sheets

SERVICE LOGIC CONTEXT CACHE FOR SIGNALING EVENTS

BACKGROUND OF THE INVENTION

1. Technical Field

The invention relates to the field of telephony and, more particularly, to exchanging information between service logic components in a telephony network.

2. Description of the Related Art

Telecommunication companies continually create new telephony services and/or features (hereafter "services") to be offered to subscribers. Often, these services require the interaction of multiple service logic components. One common example is call control service logic and transaction service logic. While the call control service logic is associated with setting up the voice communication aspects of a telephone call, the transaction service logic provides the foundation for non-voice processing aspects of a telephone service such as 800 number translation, database querying, Short Message Service (SMS), Local Number Portability, and other transaction-based services or service components. Thus, to implement a given telephony service, call control service logic often must interact with transaction service logic.

For example, if a telephone call is to be transferred to another directory number as a result of a number translation performed by the transaction service logic, the call control service logic must be able to obtain the call transfer information from the transaction service logic. That is, responsive to receiving a telephone call, the call control service logic must query the originating service, in this case the transaction service logic, to determine how to handle the telephone call. Traditionally, this interaction between different service logic components has been accomplished through the use of a service-to-service messaging protocol.

Through the service-to-service messaging protocol, a receiving service can determine contextual information regarding a given telephone call. Accordingly, the receiving service, in this case the call control service logic, with reference to the contextual information, can process the telephone call. The service-to-service messaging mechanism, however, has disadvantages. One such disadvantage is that the originating service must remain active to provide information in the form of multiple messages to any receiving services in need of contextual information to complete a call. The originating service becomes the "master" and the receiving service becomes the "slave". The originating service remains active solely to provide needed messaging functions for receiving services despite the fact that the primary function of the originating service has completed. In consequence, costly memory and processor resources are consumed for the duration of the service-to-service lifetime.

Another disadvantage is that the cost of updating a service-to-service messaging protocol can be very high. Notably, each service logic component that relies on the service-to-service messaging protocol must be updated along with the protocol itself. Thus, at a minimum, two service logic components must be updated for a given protocol enhancement. In consequence, multiple nodes within a telephony network may have to undergo a coordinated update process.

These types of issues have been a hindrance to the development of the Intelligent Network (IN) as well as Advanced Intelligent (AIN). Although multiple protocols such as SR-3511, 1129 CORE, CORE INAP, and the like have been developed, no global standard has emerged. Additionally, the cost model for maintaining a service control point (SCP) has begun to rival that of maintaining a telephony switch. Moreover, as services implemented using the SCP cost model are resource intensive, the need to utilize memory and processor resources for the duration of the service-to-service lifetime further increases the cost of service implementation, deployment, and maintenance.

SUMMARY OF THE INVENTION

The invention provides a solution for sharing signaling event data between two or more service logic components in a telephony system. For example, the invention can be used as an interface between a call processing system and a transaction processing system in a telephony environment. In particular, an event context cache can be communicatively linked with two or more service logic components of a telephony system. As such, the present invention can eliminate the need for the coordinated implementation of a service-to-service messaging protocol within each telephony service component. The service logic components can make entries within the event context cache and then process other events. Other service logic components can access the information within the event context cache. Accordingly an originating service logic component need not remain in focus or continue executing only to provide other service logic components with call processing instruction messages.

One aspect of the present invention can include a method for sharing signaling event data in a telephony system. The method can include receiving within a first service logic component an event from a telephony signaling network, determining an event context for the event, and storing the event context within an event context cache communicatively linked with the first service logic component and at least a second service logic component.

The first service logic component can be a call processing system including an ISDN and/or User Part interface (ISUP). The second service logic component can be a transaction processing system including a transaction capability application part (TCAP) interface. The telephony signaling network can be a Signaling System Number 7 network. Accordingly, where the event is a TCAP event, the determining event data step can include identifying a dialed number inbound service, a called directory number, and at least one telephony service to be executed from the received TCAP event.

The method further can include receiving a subsequent TCAP event, determining whether an event context for the subsequent TCAP event exists in the event context cache, and if not, determining an event context for the subsequent TCAP event. The event context for the subsequent TCAP event can specify a dialed number inbound service, a called directory number, and at least one telephony service to be executed. The event context can be stored within the event context cache. Accordingly, the call processing component can access the event context cache to determine how to process a transferred call.

Another aspect of the present invention can include a method for sharing signaling event data in a telephony system including receiving a call and determining whether an event context associated with the received call exists in an event context cache. For example, the determining step can include identifying a dialed number inbound service and a called directory number from the call and searching the event context cache according to the dialed number inbound service and the called directory number. If an entry exists in the event context cache, the event can be retrieved. For example, a location of a voice markup language script to be executed for processing the received call can be identified. If the event specifies attributes, the attributes can be identified and provided to the voice markup language script upon execution. If no event context exists in the event context cache for the received call, a call recovery mechanism can be executed.

Another aspect of the present invention can include a telephony system including a first service logic component, a second service logic component, and an event context cache communicatively linking the first service logic component and the second service logic component. The first service logic component can be a call processing system configured to process ISUP events. The second service logic component can be a transaction processing system configured to process TCAP events. The event context cache can provide information exchange between the first service logic component and the second service logic component without using a service-to-service messaging protocol.

Another aspect of the present invention can include a telephony system including a call processing component having a distributed logical environment for executing voice markup language script implementations telephony services and a transaction processing component having a distributed logical environment for executing TCAP markup language script implementations of telephony services. The call processing component and the transaction processing component can be communicatively linked by an event context cache.

The call processing component can include a call processor unit configured to receive calls. The call processor unit can include addresses of voice markup language document implementations of telephony services associated with directory numbers. The call processing component also can include a voice markup language parser configured to retrieve the voice markup language documents from the addresses and parse the voice markup language documents responsive to receiving the calls. The call processing component further can include a service processor configured to execute the parsed voice markup language documents to implement the telephony services and at least one session manager configured to coordinate the operation of the voice markup language parser and the service processor.

The transaction processing component can include a transaction service processor having addresses of TCAP markup language script implementations of telephony services associated with directory numbers. The transaction service processor can be configured to execute parsed TCAP markup language scripts to implement the telephony services. The transaction processing component also can include a TCAP markup language parser and at least one transaction session manager. The TCAP markup language parser can be configured to retrieve the TCAP markup language script implementations of telephony services from the addresses and parse the TCAP markup language scripts. The transaction session manager can be configured to coordinate the operation of the TCAP markup language parser and the transaction service processor.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention provides a solution for sharing signaling event data between two or more service logic components in a telephony system. For example, the invention can be used as an interface between a call processing system and a transaction processing system in a telephony environment. In particular, an event context cache can be communicatively linked with two or more service logic components of a telephony system. The service logic components can communicate via the event context cache by storing event context information which can indicate to other service logic components how to process a received call.

Figure 1:
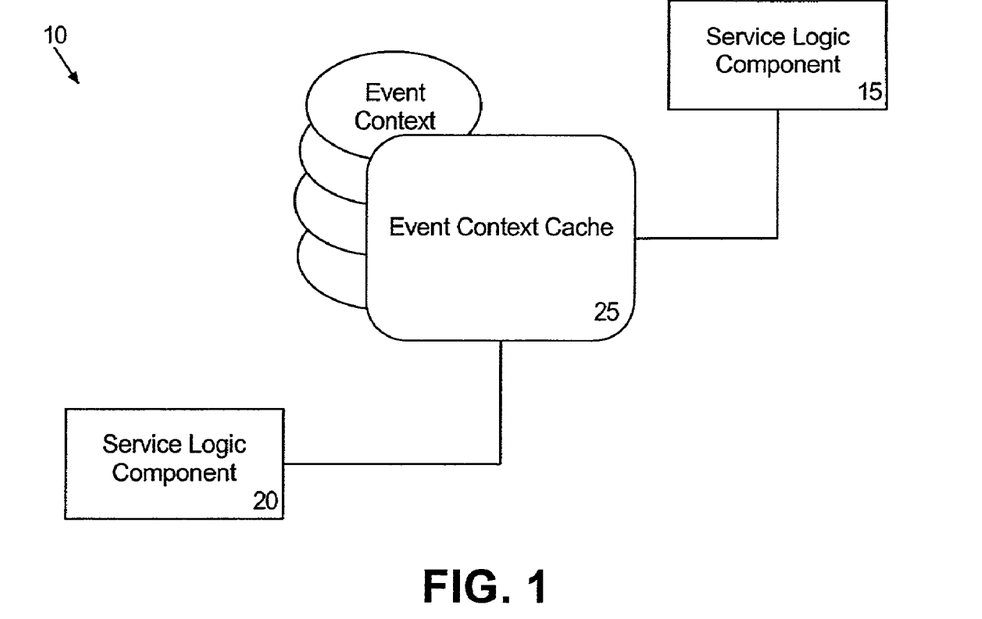
FIG. 1 is a schematic diagram illustrating an event context cache disposed between two service logic components in accordance with the inventive arrangements disclosed herein.

FIG. 1 is a schematic diagram illustrating a system 10 having an event context cache 25 disposed between two service logic components 15 and 20 in accordance with the inventive arrangements disclosed herein. The event context cache 25 can be implemented as one or more distributed computer systems, storage devices, and/or memory devices which can be communicatively linked to the service logic components 15 and 20. As such, the event context cache 25 can be used in place of service-to-service messaging protocols. Accordingly, as various signaling events are received by service logic component 15, for example, information regarding the received events can be placed as an entry within the event context cache 25. Thus, rather than service logic component 15 remaining active or "in scope" for responding to subsequent queries from service logic component 20, the resources of service logic component 15 can be devoted to another event and/or service as service logic component 20 can consult the event context cache 25 to determine signaling event information. Notably, although two service logic components are shown, those skilled in the art will recognize that more than two service logic components can be communicatively linked to the event context cache 25.

Figure 2:
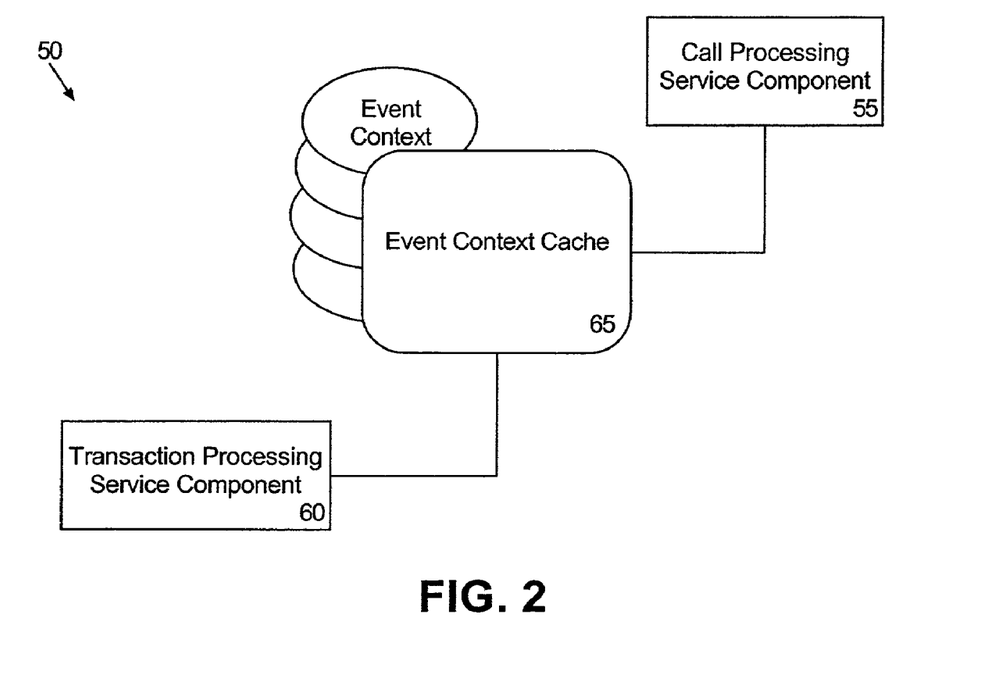
FIG. 2 is a schematic diagram illustrating an event context cache disposed between a call processing component and a transaction processing component of a telephony service system in accordance with the inventive arrangements disclosed herein.

FIG. 2 is a schematic diagram illustrating a system 50 having an event context cache 65 disposed between a call processing service component 55 and a transaction processing service component 60 of a telephony service system in accordance with the inventive arrangements disclosed herein. The call processing service component 55 can include an ISDN User Part (ISUP) interface. The transaction processing service component 60 can include a transaction capability application part (TCAP) interface.

In operation, the transaction processing service component 60 can receive a TCAP event. The transaction processing service component 60 can access the event context cache 65 to determine whether an event context associated with the received TCAP event exists in the event context cache 65. If so, then the transaction processing service component 60 can refresh the event context cache entry. If not, the transaction processing service component 60 can place a new entry in the event context cache 65. For example, the transaction processing service component 60 can place an entry within the event context cache 65 specifying a dialed number inbound service (DNIS), a called number, as well as any call processing applications, scripts, and/or associated data required for the execution of the call processing applications and scripts.

The transaction processing service component 60 can determine that, responsive to the TCAP event, a call is to be transferred to a voice mailbox associated with the DNIS. Accordingly, the transaction processing service component 60 can determine the directory number to which the call is to be transferred as well as any applications to be executed to process the transferred call. Thus, in this case, the transaction processing service component can make an entry in the event context cache specifying the DNIS, the calling number, the directory number to which the call is to be transferred, as well as any applications and application parameters.

The call processing service component 55, upon receiving the call can consult the event context cache 65 using the DNIS and the calling directory number specified by the incoming call. The call processing service component 55 can obtain information such as the directory number to which the call is to be transferred as well as any application to be executed and application parameters. The event context cache entries need only be retained for several seconds such that a receiving service component, in this case the call processing service component 55, can access needed information for processing a received call. Otherwise, if no entry in the event context cache 65 is located for the received call, the call processing service component can implement a recovery mechanism such as dropping the call, playing a message to the calling party, forwarding the call to a voice mail associated with the DNIS, or the like.

Figure 3:
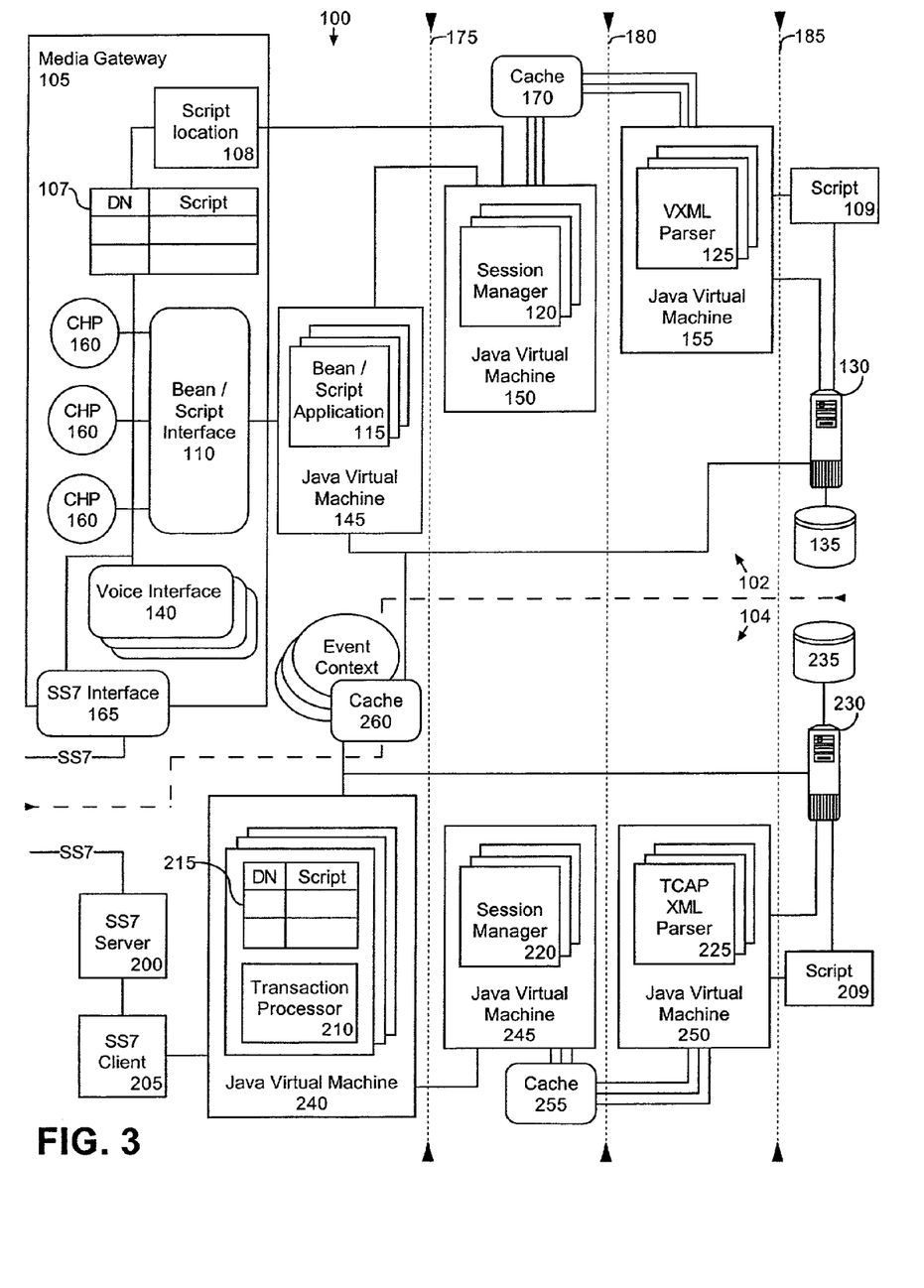
FIG. 3 is a schematic diagram illustrating a system having a call processing component and a transaction processing component in accordance with the inventive arrangements disclosed herein.

FIG. 3 is a schematic diagram illustrating an exemplary system 100 for implementing a telephony service and/or feature (hereinafter "service") in accordance with the inventive arrangements disclosed herein. As shown in FIG. 3, the system 100 can include a call control component 102 as well as a transaction processing component 104. The call control component 102 and the transaction processing component 104 can be communicatively linked via a cache 260.

The call control component 102 can include a media gateway 105, bean/script applications (service processors) 115, session managers 120, VXML parsers 125, a hyper-text transfer protocol (HTTP) server 130, and a data store 135. The data store 135 can include one or more VXML scripts specifying documents, audio, text, and the like. The VXML scripts, for example script 109, are script implementations specifying call control aspects of telephony services. The VXML scripts within the data store 135 can be accessed via the HTTP server 130. It should be appreciated that although the data store 135 is depicted as a single data store, it can be implemented as one or more distributed data stores.

The media gateway 105 can be communicatively linked to one or more telecommunication trunk lines (not shown) such as T1 lines and/or ISDN lines. Each incoming telecommunication trunk line can be interfaced with a channel processor 160 serving as an interface between the media gateway 105 and the telecommunications trunk line. One channel processor 160 can be included for each voice circuit of a corresponding telephony switch. The media gateway 105 also can include an application table 107 and a bean/script interface 110. The application table 107 can specify associations between DNISs, and the VXML script implementations of telephony services stored in data store 135. More specifically, the application table 107 maintains a listing of DNISs and telephony services for which the DNISs have been registered.

The application table 107 further specifies network locations from which the various VXML script implementations of the telephony services can be retrieved.

Accordingly, upon receiving an incoming call, the media gateway 105 can determine the DNIS specified by the incoming call. The DNIS can be matched to one or more VXML scripts using the application table 107. Thus, the locations or addresses of the VXML script implementations of the telephony services for which the DNIS has been registered can be identified. The locations of the VXML scripts of the telephony services can be provided to the session managers 120.

The media gateway 105 also can include a signaling system number 7 (SS7) interface 165. The SS7 interface 165 can include a Message Transfer Part (MTP) interface as well as an ISDN User Part Interface (ISUP). The SS7 interface 165 of the media gateway 105 can support those protocols necessary to set up and tear down calls and support voice communications. For example, the MTP interface can support services for the physical layer, the data link layer, and the network layer. The MTP interface can facilitate reliable exchange of signaling messages between two communicating endpoints. Through the use of MTP, one may perform tasks such as flow control, error checking, and message sequencing between the endpoints. The MTP interface also can provide the services necessary for ensuring the delivery between signaling points by performing addressing, routing, and congestion control. The ISUP interface can provide the necessary call control services that can be used during the establishment and termination of calls over a PSTN. Notably, the ISUP interface can be utilized to determine which procedures are appropriate for setting up, maintaining and tearing down trunk calls on the signaling network.

The bean/script interface 110, which can include bridge services or functions for connecting one local area network (LAN) to another LAN, can be included in the media gateway 105. The bean/script interface 110 can facilitate communications between the service processors 115 and the other components of the media gateway 105 such as the channel processors 160 and the voice interface 140. The bean/script interface 110 can be configured to support the range of functionality that can be provided through the VXML scripts as interpreted by the service processors 115 to be discussed herein. Notably, as the VXML scripts can support extended call control and TCAP functions, the bean/script interface 110 also can be configured to support those call control and TCAP functions. The voice interface 140 can provide speech recognition as well as text-to-speech (TTS) functions. Accordingly, speech received via the telecommunications trunk lines can be converted to text, and text data can be converted to an audio stream to be provided to one or more subscribers via the telecommunications trunk lines.

Taken together, the service processors 115, the session managers 120, and the VXML parsers 125, provide the components of a distributed voice browser. The VXML parsers 125 can be instantiated at runtime and can retrieve the VXML scripts from the data store 135 via the HTTP server 130. The VXML parsers 125 can convert the retrieved VXML scripts into an intermediate format which can be mapped to, and interpreted by, the service processors 115. Notably, the VXML scripts can be enhanced to include new tags defining TCAP transactions such as Allow Call, Block Call, Forward Call, Selective Forward Call, and Bridge Call. Accordingly, the VXML parser 125 also can be configured to identify any additional tag enhancements to the VXML scripts.

The service processors 115 can be reusable software components which can be combined with other components in the same or different computer system in a distributed computing environment. One service processor 115 can be instantiated at runtime for each channel processor 160, and thus, can be associated with that particular channel processor. The service processors 115 effectively serve as interpreters which provide the execution environment for the parsed VXML scripts to implement the telephony services specified by the VXML scripts. Accordingly, the service processors 115 match the internal functionality of the media gateway 105 with the parsed VXML script representation of the telephony service. As shown, the service processors 115 can be communicatively linked to the voice interface 140 of the media gateway 105. Thus, the service processors 115 can access TTS and speech recognition functions for implementing the telephony service as specified by the parsed VXML script. For example, text and recognized speech can be used to populate fields of a VXML script, form, and/or document.

Notably, the service processors 115 and the VXML parsers 125 can execute within Java virtual machines 145 and 155 respectively. Although FIG. 1 depicts a plurality of service processors 115 and VXML parsers 125 executing within individual Java virtual machines 145 and 155, each of the service processors 115 and the VXML parsers 125 can execute within an individual Java virtual machine thereby minimizing the risk that an error occurring within one program will adversely affect another.

Each of the service processors 115 and the VXML parsers 125 can register with the session managers 120. Accordingly, the session managers 120 can track which service processors 115 and VXML parsers 125 are available for call processing. The session managers 120 further can coordinate the operation of a service processor 115/VXML parser 125 pair. The session manager 120 can pass information between service processors 115 and VXML parsers 125. In particular, requests provided to the session managers 120 from the media gateway 105 can include the called directory number, one or more universal resource identifiers (URI), including universal resource locators (URLs), specifying one or more VXML script representations of telephony services, and an identifier representing the particular channel processor upon which the call was received. The session managers 120 can save the information in a local data store. As such, the session managers 120 can determine a free VXML parser 125 to which the received URI can be provided. Additionally, results from the VXML parsers 125 can be provided back to the proper service processor 115 according to the saved URI, called directory number, and channel processor identifier.

As was the case with the service processors 115 and the VXML parsers 125, a plurality of session managers 120 can execute within a single Java virtual machine, or each session manager 120 can execute within an individual Java virtual machine. In any case, as mentioned, the service processors 115, the session managers 120, and the VXML parsers 125 can exist in separate computing machines distributed throughout a computing network. Further, these various components can be replicated as needed to support increased processing loads. In consequence, the service processors 115, the session managers 120, and the VXML parsers 125, when taken together, provide a distributed voice browser architecture which can be scaled to support a large volume of system requests. A cache memory 170 can be disposed between the session managers 120 and the VXML parsers 125. The cache memory 170 can increase system performance by reducing multiple fetching and parsing of frequently used VXML scripts.

The transactional processing component 104 can include an SS7 TCAP server 200, an SS7 TCAP client 205, TCAP bean/script applications (transaction service processors) 210, transaction session managers 220, TCAP XML parsers 225, a hyper-text transfer protocol (HTTP) server 230, and a data store 235. The data store 235 can include one or more TCAP XML scripts, such as script 209, specifying transactions to be performed in accordance with one or more telephony services. For example, the TCAP XML scripts can implement 800 number translation, database querying, Short Message Service (SMS), Local Number Portability, and other transaction-based services or service aspects. The TCAP XML scripts within the data store 235 can be accessed via the HTTP server 230. It should be appreciated that although the data store 235 is depicted as a single data store, it can be implemented as one or more distributed data stores.

The SS7 server 200 can provide an interface to the signaling network, in this case the SS7 network. The SS7 server 200 can include an MTP interface, a Signaling Connection Control Part Interface (SCCP), as well as a TCAP interface. The SCCP interface can provide addressing capabilities to applications within a signaling point. For example, the SCCP interface can be utilized for addressing the applications that provide 800 number call processing, advanced intelligent network (AIN) services, calling or credit card processing services and custom local area signaling services (CLASS). The SS7 server 200 can provide other interfaces, for example, a mobile application part (MAP) interface, an intelligent network (IN) interface, and an advanced intelligent network (AIN) interface or an IN (ITU-T/ETSI CS1/2) interface. These interfaces can be used to either augment existing services or provide new service capabilities or enhancements.

The TCAP interface can be an application-based interface which can provide the services necessary for supporting non-circuit related activities including the exchange of transaction-related information between network entities. The TCAP interface can, for example, utilize the SCCP interface for delivering messages to applications. Notably, the TCAP interface can provide the services necessary for 800 number transactions, calling or credit card transactions, as well as AIN and CLASS transactions. The SS7 client 205 can include a library of application programming interfaces (API) that can be used to interact with the SS7 server 200. Additionally, the SS7 client 205 can facilitate communications with the transaction processors 210 through a Java enabled TCAP interface which can be referred to as a Java enabled TCAP application protocol interface.

The TCAP XML parsers 225 can be instantiated at runtime and can retrieve the TCAP XML scripts from the data store 235 via the HTTP server 230. The TCAP XML parsers 225 can convert the retrieved TCAP XML scripts into an intermediate format which can be mapped to, and interpreted by, the transaction service processors 210. The TCAP XML scripts can include tags defining TCAP transactions such as allow call, block call, forward call, selective forward call, and bridge call. Accordingly, the TCAP XML parser 225 also can be configured to identify any TCAP related tags within the TCAP XML scripts.

The transaction service processors 210 can be reusable software components which can be combined with other components in the same or different computer system in a distributed computing environment. The transaction service processors 210 can be configured to communicate with the SS7 client 205 via a Java enabled TCAP interface. One transaction service processor 210 can be instantiated at runtime for each received TCAP event, or alternatively, one or more transaction service processors 210 can remain in operation to receive TCAP events. In any case, additional transaction service processors 210 can be instantiated as needed to process additional TCAP events. Each of the transaction service processors 210 can be associated with a copy of an application table 215. The application table 215 can specify associations between DNISs, and the TCAP XML script implementations of telephony services stored in data store 235. More specifically, the application table 215 maintains a listing of DNISs and telephony services for which the DNISs have been registered. The application table 215 further specifies network locations from which the various TCAP XML script implementations of the telephony services can be retrieved.

Upon receiving a TCAP event through a TCAP interface from the SS7 client 205, a transaction service processor 210 can be instantiated. The transaction service processor 210 can receive the DNIS specified by the incoming TCAP event from the TCAP client 205. The transaction service processor 210 can match the DNIS to one or more TCAP XML scripts using the application table 215. Thus, the locations or addresses of the TCAP XML script implementations of the telephony services for which the DNIS has been registered can be identified. The locations of the TCAP XML scripts of the telephony services can be provided to the transaction session managers 220.

The transaction service processors 210 also serve as interpreters which provide the execution environment for the parsed TCAP XML scripts to implement the transactional aspects of telephony services. Through the TCAP interface, the transaction service processors 210 can interact with a TCAP stack to implement the transaction based services defined by the TCAP XML scripts.

Notably, the transaction service processors 210 and the TCAP XML parsers 225 can execute within Java virtual machines 240 and 250 respectively. Although FIG. 1 depicts a plurality of transaction service processors 210 and TCAP XML parsers 225 executing within individual Java virtual machines 240 and 250, each of the transaction service processors 210 and the TCAP XML parsers 225 can execute within an individual Java virtual machine thereby minimizing the risk that an error occurring within one program will adversely affect another.

Each of the transaction service processors 210 and the TCAP XML parsers 225 can register with the transaction session managers 220. Accordingly, the transaction session managers 220 can track which transaction service processors 210 and TCAP XML parsers 225 are available for call processing. The transaction session managers 220 further can coordinate the operation of a transaction service processor 210/TCAP XML parser 225 pair. The transaction session manager 220 can pass information between transaction service processors 210 and TCAP XML parsers 225.

For example, TCAP events provided to the transaction session managers 220 from the transaction service processors 210, after being matched to an appropriate TCAP XML script from the application table 215, can specify the DNIS, one or more universal resource identifiers (URI), including universal resource locators (URLs), specifying one or more TCAP XML script representations of telephony services, a TCAP identifier, and a transaction processor identifier. The transaction session managers 220 can save the information in a local data store. Accordingly, the transaction session managers 220 can determine a free TCAP XML parser 225 to which the received URI can be provided. Additionally, results from the TCAP XML parsers 225 can be provided back to the proper transaction service processor 215 according to the saved URI, the DNIS, and transaction processor identifier.

As was the case with the transaction service processors 210 and the TCAP XML parsers 225, a plurality of transaction session managers 220 can execute within a single Java virtual machine, or each transaction session manager 220 can execute within an individual Java virtual machine. In any case, as mentioned, the transaction service processors 210, the transaction session managers 220, and the TCAP XML parsers 225 can exist in separate computing machines distributed throughout a computing network. Further, these various components can be replicated as needed to support increased processing loads. In consequence, the transaction service processors 210, the session managers 220, and the TCAP XML parsers 225, when taken together, provide a distributed TCAP event processing architecture having distinct logical components which can be scaled to support a large volume of TCAP events.

A cache memory 255 can be disposed between the transaction session managers 220 and the TCAP XML parsers 225. The cache memory 255 can increase system performance by reducing multiple fetching and parsing of frequently used TCAP XML scripts. The inventive arrangements disclosed herein further can include one or more firewalls 175, 180, and 185. Although firewalls are not necessary for operation of the system 100 as disclosed herein, the addition of the firewalls provides added network security. In particular, firewalls 175 and 180 provide double firewall protection as required by many telecommunications companies. Firewall 185 can provide isolation of the VXML and TCAP XML parsers from corporate or other private networks.

The call processing component 102 and the transactional processing component 104 can be communicatively linked by an event context cache 260. The event context cache 260 can be an asynchronous cache wherein the entries have a life cycle of only several seconds. The transactional processing component 104 can store information regarding a call, a TCAP event, or service within the event context cache 260. The information stored in the context cache by the transactional processing component 104 can be accessed by the call processing component 102. As such, the information can provide the call processing component 102 with an indication as to how to process a call that is transferred or received by the call processing component 102 as a result of a TCAP event received in the transactional processing component 104.

For example, when executing a TCAP XML script, the transaction service processors 210 can make an entry in the context cache 260. Though each entry is maintained for only a few seconds, the entry can specify information including the DNIS, the calling number, as well as a service name or URI, for example a VXML script to be executed, as well as any parameters which may be needed by the VXML script for execution. Notably, the event context for a received TCAP event can be determined through execution of a TCAP XML script. When the call processing component receives a transferred call, the call processing component 102 can access the context cache 260 to determine a proper course of action for processing the call, rather than querying the transaction processing component 104 through a service-to-service messaging protocol.

Figure 4:
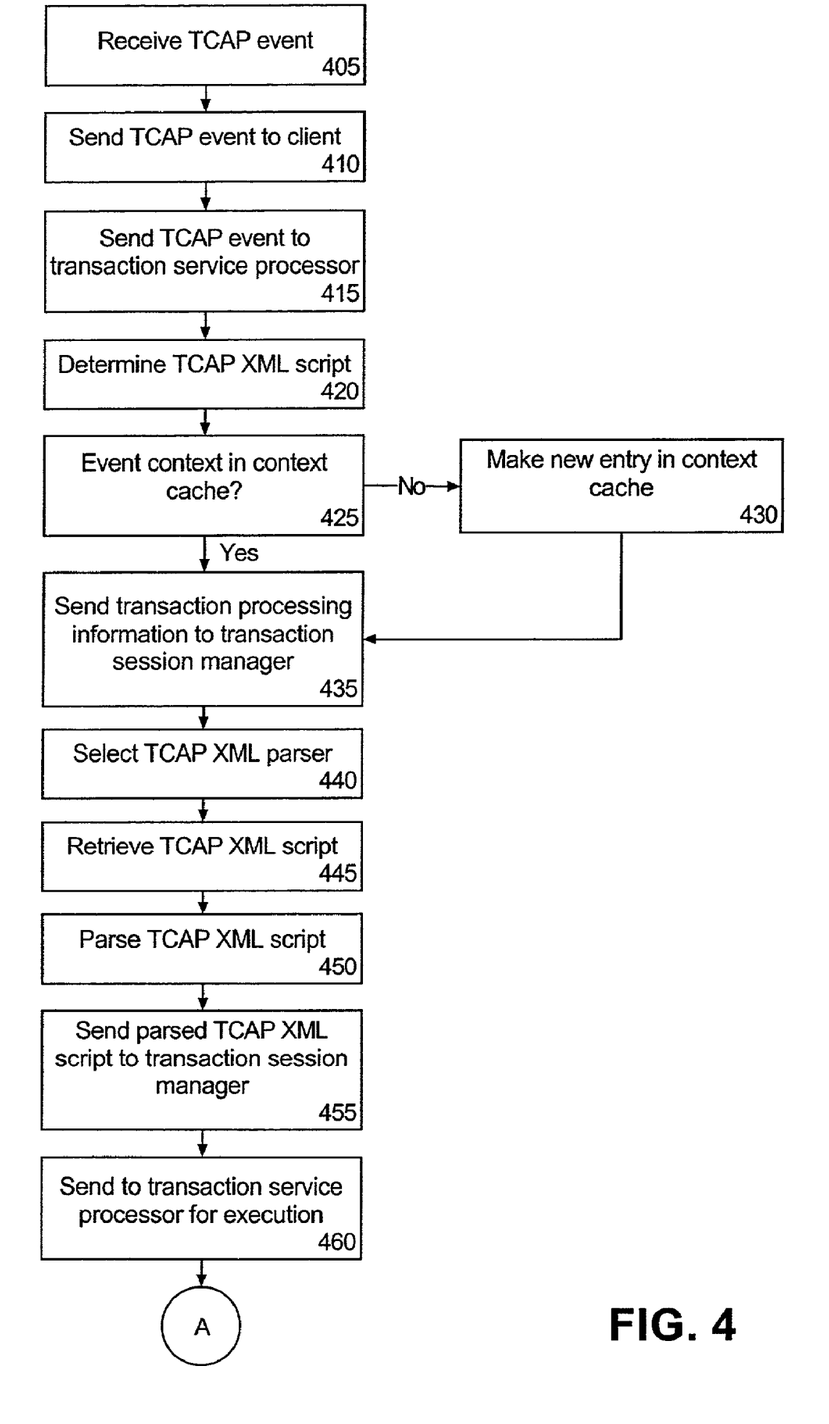
FIG. 4 is a flow chart illustrating a method of processing transaction events received from a signaling network as performed by the system of FIG. 3.

FIG. 4 is a flow chart illustrating a method 300 of implementing transactional aspects of a telephony service as performed by the system of FIG. 3. The method can begin in a state wherein the system of FIG. 3 has instantiated at least one transactional service processor. Additionally, one or more parsers, such as TCAP XML parsers, can be instantiated such that the transaction service processors and the parsers have registered with the transaction session managers. Notably, there need not be a one to one correspondence between the service processors and the parsers. In any event, in step 405, the SS7 server can receive a TCAP event from the signaling network. In step 410, the received TCAP event can be sent to the SS7 client over an IP connection.

The TCAP event then can be provided to a transaction service processor in step 415. The TCAP event can specify a DNIS and a calling directory number. Accordingly, in step 420, one or more TCAP XML scripts which are associated with the DNIS can be identified. For example, the listing of DNISs and associated TCAP XML scripts can be consulted to determine the particular TCAP XML script implementations of telephony services for which the DNIS has been registered.

In step 425, a determination can be made as to whether an entry corresponding to the received TCAP event has been made in the event context cache. If so, the method can proceed to step 435. If not, however, the method can continue to step 430 where an entry can be made in the event context cache. The entry in the event context cache can include the DNIS, the calling directory number, one or more associated VXML call processing scripts, as well as any parameter data that may be required by the specified VXML call processing scripts. Additionally, any other information subsequently determined through execution of a TCAP XML script also can be written to the event context cache.

In step 435, the transaction service processor can send at least the following information to the transaction session manager via a TCP/IP connection: the DNIS, one or more URIs specifying TCAP XML script implementations of telephony services for which the directory number has been registered, an identifier representing the particular transaction processor to which the TCAP event was initially assigned, as well as a TCAP identifier. Although not shown in FIG. 4, prior to transmitting the URI to an available parser, the transaction session manager can query a script cache memory via a TCP/IP connection to determine whether the TCAP XML script specified by the URI is contained within the cache memory. If so, the TCAP XML script has already been parsed by the parser and exists in an intermediate format which can be executed by the transaction service processors. Accordingly, the parsed TCAP XML script can be retrieved from the cache memory and provided to the transaction session managers, thereby skipping steps 440, 445, 450, and continuing with step 455.

In step 440, the transaction session manager can identify an available parser and provide the URI to the parser through a TCP/IP connection. Notably, the transaction session manager can save a local copy of the transaction processor identifier. In step 445, the parser can issue an HTTP request to an HTTP server to retrieve the TCAP XML script specified by the URI. The TCAP XML script can implement services such as allow call, block call, forward call, selective forward call, bridge call, as well as other functions including querying network databases, and the like. In step 450, the parser can receive the requested TCAP XML script via an HTTP connection. The parser then can parse the TCAP XML script, converting the TCAP XML script into an intermediate format which can be interpreted and executed by the transaction service processors.

In step 455, the parsed call processing script can be transmitted from the parser to the transaction session manager via a TCP/IP connection. The session manager, in step 455, having retained the transaction processor identifier, can identify the transaction service processor associated with the original TCAP event and the received parsed TCAP XML script for processing the TCAP event. In step 460, the transaction session manager can transmit the parsed TCAP XML script to the identified transaction service processor. Accordingly, the transaction service processor can implement the telephony service by executing the parsed TCAP XML script. As mentioned, any other information subsequently determined through execution of a TCAP XML script also can be written to the event context cache. After step 460, the method can continue to jump circle A and continue to step 505 in FIG. 5.

Figure 5:
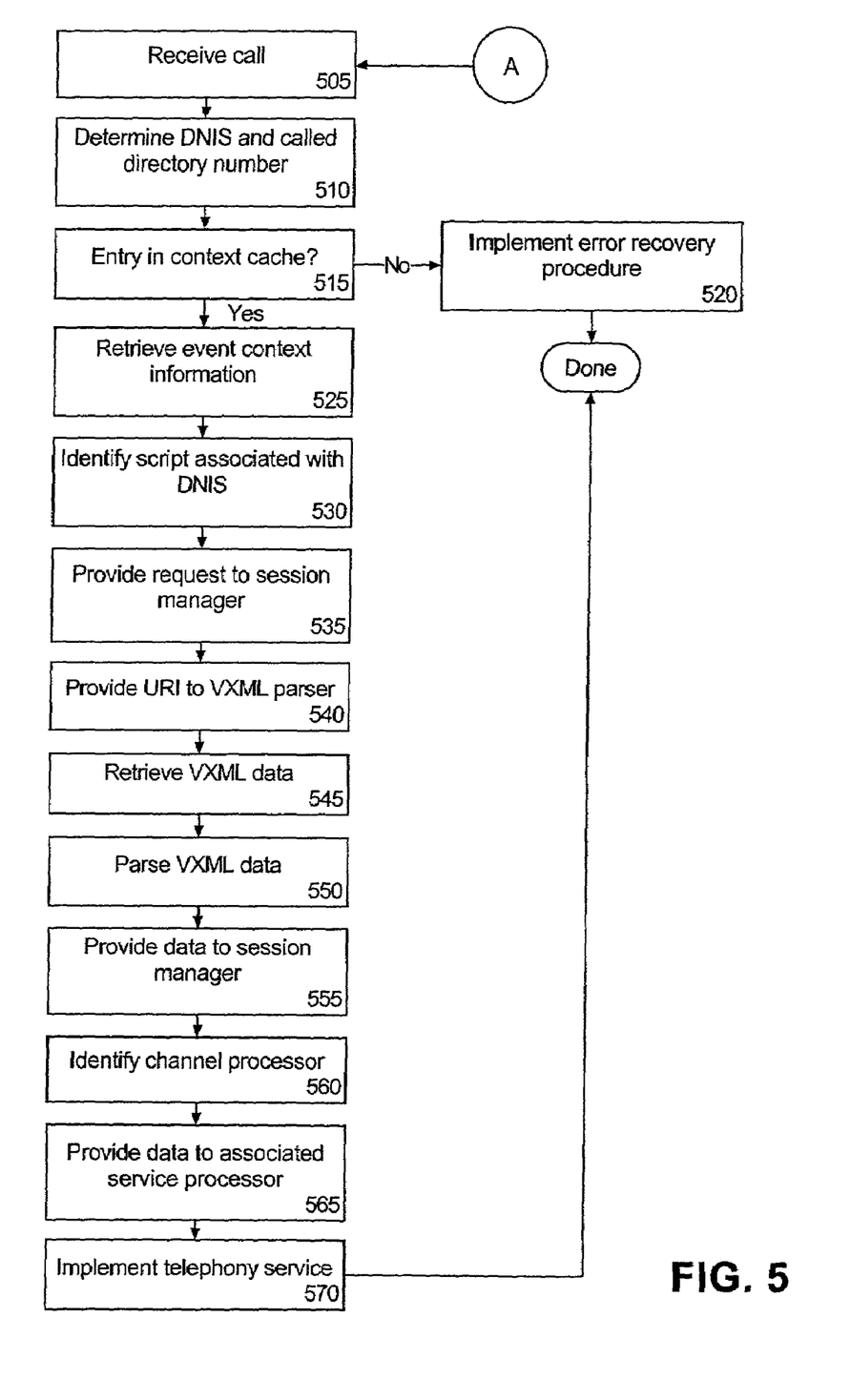
FIG. 5 is a flow chart illustrating a method of call processing as performed by the system of FIG. 3.

FIG. 5 is a flow chart illustrating a method of call processing as performed by the system of FIG. 3. The method can begin in a state wherein the call processing component of FIG. 3 has instantiated at least one service processor for each channel processor of the media gateway. Additionally, one or more parsers, such as VXML parsers, can be instantiated such that the service processors and the parsers have registered with the session managers. Notably, there need not be a one to one correspondence between the service processors and the parsers. In any event, a telephony switch can receive a call. The telephony switch can select a free channel processor of the media gateway and query the media gateway to accept the call, for example using inband signaling or ISDN D-channel. Responsive to the media gateway accepting the call, the telephony switch can apply the call to the chosen channel processor. Accordingly, in step 505, the call can be received by the media gateway, for example, as a result of a call transfer initiated by a received TCAP event in the transaction processing component. In step 510, the DNIS and the called directory number of the received call can be determined.

In step 515, a determination can be made as to whether an entry exists in the event context cache for the received call. For example, entries in the event context cache can be stored using a hash table. Accordingly, the DNIS and the called directory number of a received call can be used to determine a hash key for locating an entry for the received call. If no entry exists in the event context cache, then the method can continue to step 520, where a recovery procedure can be implemented. As mentioned, the recovery procedure can include playing a message to the caller, dropping the call, or forwarding the call to a default voice mail address associated with the DNIS. After the recovery procedure has been implemented, the method can end.

If an entry does exist in the event context cache for the received call, then the method can proceed to step 525. In step 525, the information specified by the event context cache entry can be retrieved from the event context cache. In step 530, one or more call processing scripts associated with the DNIS can be identified. For example, the listing of DNISs and associated VXML scripts can be consulted to determine the particular call processing scripts, or VXML script representations of telephony services, for which the DNIS has been registered. Notably, the listing of DNISs and associated VXML scripts can be searched using the DNIS or other information including directory numbers as specified by the event context cache entry. For example, the event context cache entry can specify one or more VXML scripts or locations of VXML scripts to be executed.

In step 535, the media gateway can send the following information to the session manager via a TCP/IP connection: the called directory number, one or more URIs specifying call processing script representations of telephony services for which the directory number has been registered, and an identifier representing the particular channel processor upon which the call was received.

Although not shown in FIG. 5, prior to transmitting the URI to an available parser, the session manager can query a script cache memory via a TCP/IP connection to determine whether the call processing script specified by the URI is contained within the cache memory. If so, the call processing script has already been parsed by the parser and exists in an intermediate format which can be executed by the service processors. Accordingly, the parsed call processing script can be retrieved from the cache memory and provided to the session managers, thereby skipping steps 540, 545, 550, and continuing with step 555.

The session manager can identify an available parser and provide the URI to the parser through a TCP/IP connection in step 540. Notably, the session manager can save a local copy of the channel processor identifier. In step 545, the parser can issue an HTTP request to an HTTP server to retrieve the call processing script specified by the URI. The call processing script can include, for example, voice markup language scripts such as VXML documents, text, scripts, as well as selected portions of audio. The parser can receive the requested call processing script via an HTTP connection. Accordingly, in step 550, the parser then can parse the call processing script, converting the call processing script into an intermediate format which can be interpreted by the service processors.

In step 555, the parsed call processing script can be transmitted from the parser to the session manager via a TCP/IP connection. The session manager, in step 560, having retained the channel processor identifier, can identify a service processor (script/bean) associated with the channel processor that received the call. In step 565, the session manager can transmit the parsed call processing script to the identified service processor. Accordingly, the service processor can implement the telephony service by executing the parsed call processing script in step 570. The service processors can access any required functionality, such as the voice processor of the media gateway, via the bean/script interface to implement the telephony service.

Below is an exemplary TCAP XML script that can be utilized for requesting a forwarding directory number for routing a call.

```
<?xml version=1.0"?>
<txml version=1.0">
    <catch event="jain.protocol.ss7.tcap.component.InvokeIndEvent"
    name="request">
        <var name="number"
        expr="Onlinecalendar.getForwardNumber(request.getDigits( ).
        newDate( ))"/>
        <object name="provider" expr="request.getProvider( )">/
        <script>
        <![CDATA[
        provider.sendResults(number);
```

-continued

```
        ]]>
        </script>
    </catch>
</txml>
```

The exemplary TCAP XML script illustrates a service which can forward a telephone call to another telephone number based on retrieving the called party's number as specified within an online calendar application, such as Lotus Notes (TM). The online calendar application can specify where a party can be reached at various times of the day. The TCAP XML script can request a forwarding telephone number from the online calendar application and return the forwarding number as a TCAP formatted message. In other words, the TCAP XML script can use a received TCAP event to look up a currently active forwarding number in a calendar application based upon the called number and the current date and time. The TCAP XML script then can get the TCAP provider from the request and use that object to return the result.

The event context can be written to the event context cache. As previously noted, the event context cache entry can specify voice markup language scripts, parameters of the scripts, as well as any directory numbers which can be used by the call processing component for determining one or more voice markup language scripts to be executed for processing a given call.

The invention provides a solution for sharing event context data between two or more service logic components in a telephony system. By providing an event context cache serving as an interface between service logic components such as call processing and transaction processing, the present invention eliminates the need for the coordinated implementation of a service-to-service messaging protocol within each telephony service component. In addition to eliminating the need for developing and maintaining coordinated service-to-service protocols within multiple service logic components, the present invention also frees much needed telephony computing resources, thereby reducing the cost of telephony service development, deployment, and maintenance.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for sharing signaling event data in a telephony system comprising:

receiving within a call processing system a TCAP event from a telephony signaling network;

determining an event context for said TCAP event by identifying a dialed number inbound service, a called directory number, and at least one telephony service to be executed;

storing said event context within an event context cache communicatively linked with said call processing system and at least a transaction processing system;

upon receiving a subsequent TCAP event, determining whether an event context for said subsequent TCAP event exists in said event context cache; and if not, determining an event context for said subsequent TCAP event specifying a dialed number inbound service, a called directory number, and at least one telephony service to be executed, and storing said event context within said event context cache, wherein said call processing system comprises at least one of an ISDN interface and an ISUP interface, said transaction processing system comprises a TCAP interface, and said telephony signaling network is a Signaling System Number 7 network.

2. The method of claim 1, further comprising:

retrieving said event context cache to determine how to process a transferred call.

3. A method for sharing signaling event data in a telephony system comprising:

receiving a call on a call control component;

determining whether a temporary event context associated with said received call exists in an event context cache by using a DNIS and a calling directory number specified by said call as a hash key to said cache;

if an entry is located in said event context cache, retrieving said temporary event context from said event context cache using said DNIS and said called directory number, said event context containing transactional event information to process said call, releasing resources from said call control component which support transactional processes of said call, and instead using said event context to handle transactional aspects of said call; and if an entry is not located in said event context cache, executing a call recovery mechanism, wherein said event context cache entries are only temporarily retained in said cache to allow access to said event context for processing transactional aspects of said call prior to releasing transactional processes of said call.

4. The method of claim 3, said retrieving step further comprising:

identifying a location of an executable voice markup language script to process said received call by matching said DNIS to one or more XML scripts through an application table.

5. The method of claim 4, said identifying step further comprising:

identifying attributes specified by said event context, wherein said attributes are provided to said voice markup language script upon execution, wherein said attributes are contained in event context cache entry and specify one of voice markup language scripts parameters of the scripts, and directory numbers.

6. A telephony system comprising:

a call processing component comprising a distributed logical environment for executing voice markup language script implementations telephony services:

said call processing component comprises one of an ISDN interface and an ISUP interface for:

receiving a TCAP event from a telephony signaling network;

determining an event context for said TCAP event by identifying a dialed number inbound service, a called directory number, and at least one telephony service to be executed, storing said event context within an event context cache communicatively linked with said call processing component and at least a transaction processing component;

a transaction processing component comprising a distributed logical environment for executing TCAP markup language script implementations of telephony services:

said transaction processing component comprises a TCAP interface for:

upon receiving a subsequent TCAP event, determining whether an event context for said subsequent TCAP event exists in said event context cache; and if not, determining an event context for said subsequent TCAP event specifying a dialed number inbound service, a called directory number, and at least one telephony service to be executed and storing said event context within said event context cache; and an event context cache communicatively linking said call processing component and said transaction processing component, wherein said event context cache contains entries that are only temporarily retained to allow access to said event context for processing transactional aspects of a call associated with said TCAP event prior to releasing transactional processes of said call.

7. The system of claim 6, wherein said call processing component comprises a call processor unit configured to receive calls, said call processor unit having a plurality of addresses of voice markup language document implementations of telephony services associated with said plurality of directory numbers, a voice markup language parser configured to retrieve said voice markup language documents from said addresses and parse said voice markup language documents responsive to receiving said calls, a service processor configured to execute said parsed voice markup language documents to implement said telephony services, and at least one session manager configured to coordinate the operation of said voice markup language parser and said service processor.

8. The system of claim 6, wherein said transaction processing component comprises a transaction service processor having a plurality of addresses of TCAP markup language script implementations of telephony services associated with a plurality of directory numbers, wherein said transaction service processor is configured to execute parsed TCAP markup language scripts to implement said telephony services, a TCAP markup language parser configured to retrieve said TCAP markup language script implementations of telephony services from said addresses and parse said TCAP markup language scripts, and at least one transaction session manager configured to coordinate the operation of said TCAP markup language parser and said transaction service processor.

9. A machine-readable storage having stored thereon, a computer program having a plurality of code sections, said code sections executable by a machine for causing the machine to perform the steps of:

receiving within a call processing system a TCAP event from a telephony signaling network;

determining an event context for said TCAP event by identifying a dialed number inbound service, a called directory number, and at least one telephony service to be executed;

storing said event context within an event context cache communicatively linked with said call processing system and at least a transaction processing system, upon receiving a subsequent TCAP event, determining whether an event context for said subsequent TCAP event exists in said event context cache; and if not, determining an event context for said subsequent TCAP event specifying a dialed number inbound service, a called directory number, and at least one telephony service to be executed, and storing said event context within said event context cache, wherein said call processing system comprises at least one of an ISDN interface and an ISUP interface, said transaction processing system corn rises a TCAP interface, and said telephony signaling network is a Signaling System Number 7 network.

10. The machine-readable storage of claim 9, further comprising:

retrieving said event context cache to determine how to process a transferred call.

11. A machine-readable storage having stored thereon, a computer program having a plurality of code sections, said code sections executable by a machine for causing the machine to perform the steps of:

receiving a call on a call control component;

determining whether a temporary event context associated with said received call exists in an event context cache by using a DNIS and a calling directory number specified by said call as a hash key to said cache;

if an entry is located in said event context cache, retrieving said temporary event context from said event context cache using said DNIS and said called directory number, said event context containing transactional event information to process said call, releasing resources from said call control component which support transactional processes of said call, and instead using said event context to handle transactional aspects of said call; and if an entry is not located in said event context cache, executing a call recovery mechanism, wherein said event context cache entries are only temporarily retained in said cache to allow access to said event context for processing transactional aspects of said call prior to releasing transactional processes of said call.

12. The machine-readable storage of claim 11, said determining step further comprising:

identifying a dialed number inbound service and a called directory number from said call; and searching said event context cache according to said dialed inbound service and said called directory number.

13. The machine-readable storage of claim 12, said retrieving step further comprising:

identifying a location of an executable voice markup language script to process said received call by matching said DNIS to one or more VXML scripts through an application table.

14. The machine-readable storage of claim 13, said identifying step further comprising:

identifying attributes specified by said event context, wherein said attributes are provided to said voice markup language script upon execution, wherein said attributes are contained in event context cache entry and specify one of voice markup language scripts, parameters of the scripts, and directory numbers.

* * * * *